United States Patent [19]
Nakajima et al.

[11] Patent Number: 5,590,152
[45] Date of Patent: Dec. 31, 1996

[54] DC ARC FURNACE

[75] Inventors: Shinobu Nakajima, Matsudo; Kunji Maebou, Kasukabe, both of Japan

[73] Assignee: Ishikawajima-Harima Jukogyo Kabushiki Kaisha, Tokyo, Japan

[21] Appl. No.: 331,555

[22] PCT Filed: Apr. 14, 1994

[86] PCT No.: PCT/JP94/00616
§ 371 Date: Nov. 15, 1994
§ 102(e) Date: Nov. 15, 1994

[87] PCT Pub. No.: WO94/24504
PCT Pub. Date: Oct. 27, 1994

[30] Foreign Application Priority Data

Apr. 15, 1993 [JP] Japan ................................. 5-088802

[51] Int. Cl.$^6$ ........................................................ H05B 7/11
[52] U.S. Cl. ............................ 373/103; 373/72; 373/108
[58] Field of Search ............................... 373/64, 65, 66, 373/72, 102, 103, 104, 107, 108

[56] References Cited

U.S. PATENT DOCUMENTS

| | | |
|---|---|---|
| 4,550,413 | 10/1985 | Lassander et al. ................... 373/108 |
| 4,607,373 | 8/1986 | Bergman . |
| 4,995,051 | 2/1991 | Hakulin et al. . |
| 5,274,663 | 12/1993 | Stenkvist ................................. 373/103 |
| 5,479,435 | 12/1995 | Yoshida et al. ........................... 373/81 |

FOREIGN PATENT DOCUMENTS

| | | |
|---|---|---|
| 0068180 | 1/1983 | European Pat. Off. . |
| 2611876 | 9/1988 | France . |
| 3621323 | 1/1987 | Germany . |
| 56-47505 | 11/1981 | Japan . |

Primary Examiner—Tu Hoang
Attorney, Agent, or Firm—Oblon, Spivak, McClelland, Maier & Neustadt, P.C.

[57] ABSTRACT

Two upper electrodes 16 and 17 are horizontally spaced apart from each other with a predetermined distance and vertically extend through a furnace roof 3 of a furnace shell 2. Upper conductors 20 and 21 are connected to the upper electrodes 16 and 17 and extend in a direction away from the upper electrodes 17 and 16, respectively. Two lower conductors 22 and 23 are connected to a lower electrode 1 and extend in directions along which the upper conductors 20 and 21, respectively. Power source circuits 24 and 25 are arranged between extension ends of the upper and lower conductors 20 and 22 and 21 and 23, respectively. Arcs 12a and 12b generated between the upper electrodes 16 and 17 and the lower electrode 1 are directed to a center of the furnace shell 2.

2 Claims, 5 Drawing Sheets

DC ARC FURNACE

TECHNICAL FIELD

The present invention relates to a DC arc furnace for melting scrap or pig iron in the form of cold block.

BACKGROUND ART

There have been used DC arc furnace as shown in FIG. 1 to melt scrap material.

As shown in FIG. 1, a DC arc furnace comprises a furnace shell 2 with a lower electrode 1 (anode) at its bottom, a furnace roof 3 adapted to close an upper portion of the furnace shell 2, an upper electrode 4 extending through the roof 3 and movable vertically, a lower conductor 5 connected to the lower electrode 1 and extending radially, an upper conductor 6 connected to the upper electrode 4 and extending radially and a power source circuit 10 including a transformer 8 and a rectifier 9 both arranged between the extension ends of the upper and lower conductors 5 and 6 and connected to an AC power source 7.

In an operation of melting scrap or the like material 11, the roof 3 is moved upward and removed outside to open the upper portion of the furnace shell 2. Using a bucket or the like, the material 11 is charged into the furnace shell 2. Then, the top of the furnace shell 2 is closed with the roof 3 and heavy-current is excited across the electrodes 1 and 4 by the power source circuit 10. While arc 12 is generated between the electrodes 1 and 4, the upper electrode 4 is gradually lowered to melt the material 11.

However, the conventional DC arc furnace as shown in FIG. 1 has a problem of the arc 12 between the electrodes 1 and 4 being generated in a deflected direction.

This will be explained more specifically. In the upper and lower conductors 6 and 5, which are respectively connected to the upper and lower electrodes 4 and 1 and extend radially, the upper conductor 6 is arranged to be vertically movable further above the roof 3; whereas the lower conductor 5 must be arranged at a position near the arc 12 to be generated since no great space is allowed below the furnace shell 2. Therefore, a strong magnetic field 13 generated by the heavy-current flowing through the lower conductor 5 acts on the arc 12. The magnetic field 13 is generated right-handedly in accordance with right-hand screw rule by the heavy-current flowing through the lower conductor 5 to the lower electrode 1 as shown by the arrows.

Since the electric current flowing upward in the upper electrode 4 as shown by the arrow due to the arc 12 crosses the magnetic field 13, the arc 12 receives force F in a direction toward a furnace peripheral wall 14, i.e., in a direction (to the left) away from the radial direction along which the the lower conductor 5 extends, in accordance with the Fleming's left-hand rule on the basis of the (upward) direction of the electric current and the direction (perpendicular to the sheet of FIG. 1 and from front to back of the sheet) of the magnetic field 13. As a result, the material 11 charged to the center of the furnace shell 2 is melted positively merely in the deflected direction of the arc 12 and is hardly melted at a side away from the deflected direction so that unmelted material is left and/or a hot spot or spots are generated, resulting in nonuniform temperatures in the furnace shell and extreme lowering of the melting efficiency.

The arc 12, which is deflected, tends to be directed to the furnace peripheral wall 14, resulting in damages of the wall. In order to prevent the peripheral wall 14 from being damaged, enough distance must be retained between the upper electrode 4 and the furnace peripheral wall 14, which disadvantageously causes a problem of the furnace shell 2 being increased in size.

The present invention was made to overcome the above problems encountered in the prior art and has for its object to provide a DC arc furnace in which two upper electrodes are provided to be connected to their respective power source circuits and arcs generated are directed to the center of the furnace shell, thereby enhancing the melting efficiency of the material, preventing the furnace peripheral wall from being damaged and worn and compacting the furnace shell in size. Because of the deflected degree of the arcs being changeable, concentrated melting of unmelted material can be facilitated and hot spots are eliminated.

DISCLOSURE OF THE INVENTION

According to the present invention, upper conductors each connected to a corresponding one of two upper electrodes extend in directions each away from the remainder of the upper electrodes. Two conductors connected to a lower electrode extend in the same directions of the corresponding upper electrodes, respectively. Separate power source circuits are arranged between the corresponding upper and lower electrodes, respectively. As a result, arcs generated between the corresponding upper and lower electrodes receive forces in the directions opposite to the directions of extension of the corresponding lower conductors under the influence of magnetic fields generated by electric currents flowing through the corresponding lower conductors, respectively; that is, the arcs receives the forces directed to the center of the furnace shell. Moreover, by a magnetic field generated by the electric currents vertically flowing from the lower electrode through the corresponding upper electrodes to the corresponding upper conductors, forces are generated on the basis of the above-mentioned Fleming's left-hand rule to urge the arcs to the center of the furnace shell. The arcs are directed to the center of the furnace shell by these two kinds of forces so that the material fed to the center of the furnace shell is effectively melted and temperature distribution in the furnace shell become symmetric, thereby enhancing the efficiency of melting the material. Because of the arcs being directed to the center of the furnace shell, the furnace peripheral wall is prevented from being damaged and the distance between the upper electrodes and the furnace peripheral wall can be minimized to compact the furnace shell in size.

Furthermore, according to the present invention, the power source circuits may comprise arc current controllers for controlling output voltages so as to harmonize the current strength of an AC power source connected to rectifiers or the DC electric current after the rectification with preset current strength values, arc voltage controllers for controlling the vertical movements of the upper electrodes so as to harmonize the voltages across the corresponding upper and lower electrodes with the preset voltage values and an arc deflection commanding device for feeding the preset values to the arc current controllers and the arc voltage controllers, respectively. As a result, when the voltage and current strength of the one power source circuit are set to the preset values and magnitudes of those of the other power source circuit are changed by changing the vertical position of the corresponding upper electrode, then the arc length is changed to change the deflection degree of the arcs, thereby facilitating concentrated melting of the unmelted material. When such operation is repeated alternately by the one and the other power source circuits, generation of any hot spots is eliminated so that melting of the material can be effected effectively at more uniform temperature.

BEST MODE FOR CARRYING OUT THE INVENTION

An embodiment of the present invention will be described in conjunction with the accompanying drawings.

Figure 2:
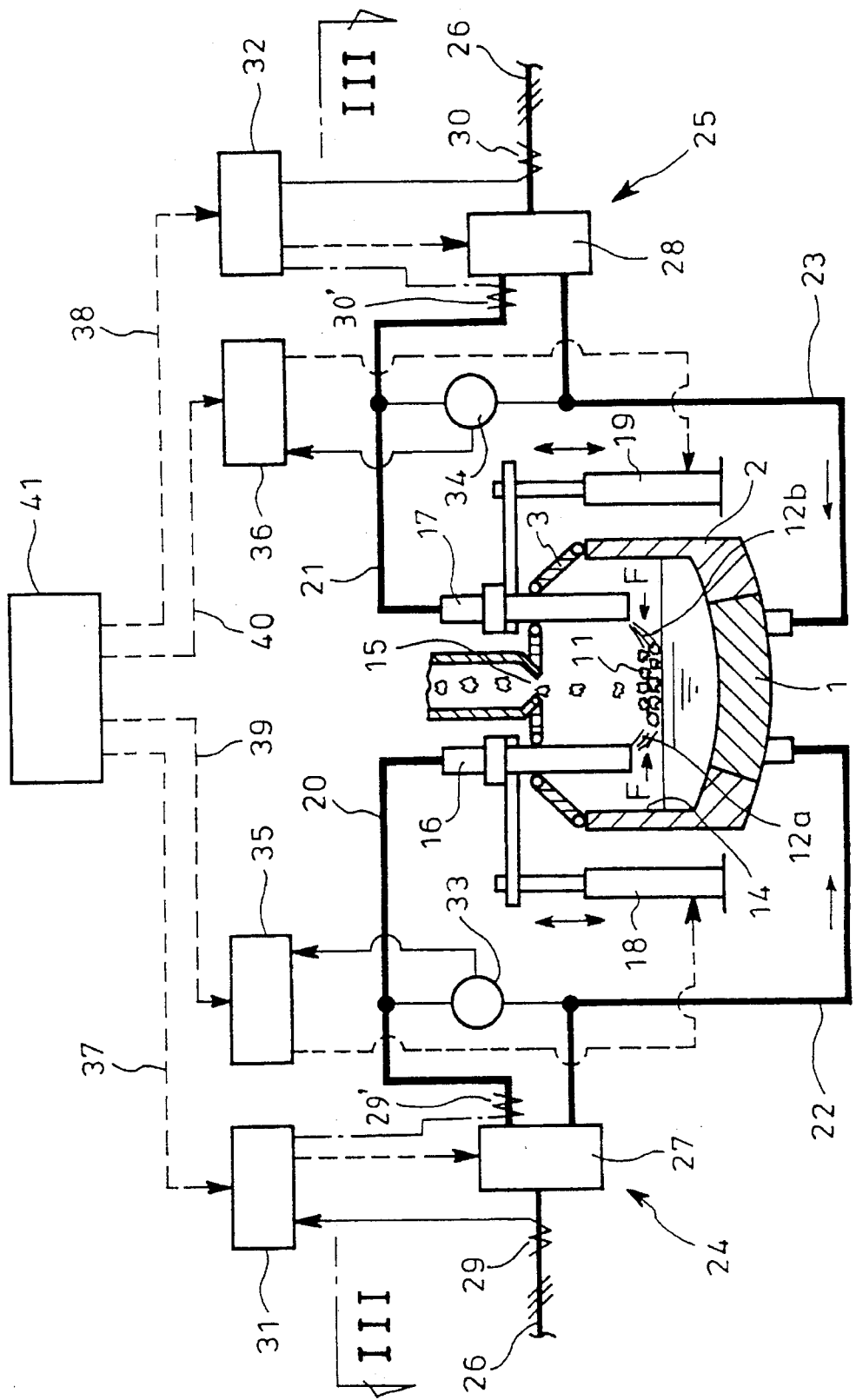
FIG. 2 is a front view in section of an embodiment of the present invention.
Figure 3:
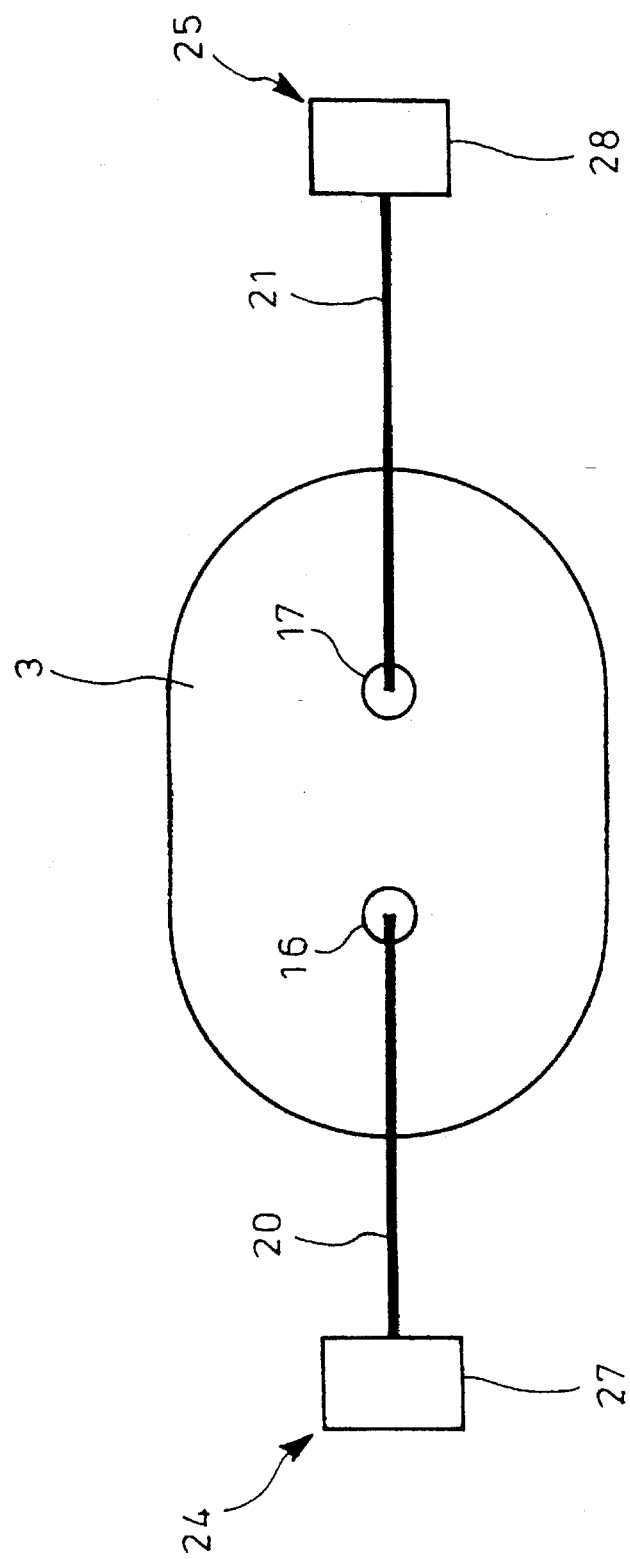
FIG. 3 is a view looking in the direction III—III in FIG. 2.

FIGS. 2 and 3 illustrate an embodiment of the present invention in which a furnace shell 2 oval in cross section has a lower electrode 1 at its bottom and is closed at its upper portion by a furnace roof 3. A material charging port 15 is formed through the roof 3 substantially at a center thereof. Two upper electrodes 16 and 17 extend through the roof 3 at opposite positions relative to the port 15 in a longitudinal direction of the oval. The upper electrodes 16 and 17 are supported by electrode lifting devices 18 and 19, respectively, such that they are vertically movable independently from each other.

Connected to the one upper electrode 16 is an upper conductor 20 which extends in a direction away from the other upper electrode 17. Connected to the other upper electrode 17 is an upper conductor 21 which extends in a direction away from the one upper electrode 16. Connected to the lower electrode 1 are two lower conductors 22 and 23 which extend in the same directions of the upper conductors 20 and 21, respectively. One power source circuit 24 is arranged between the extension ends of the upper and lower conductors 20 and 22 and the other power source circuit 25 is arranged between the upper and lower conductors 21 and 23.

The power source circuit 24, 25 comprises a rectifier (thyristor) 27, 28 connected to a three-phase AC power source 26, a current detector 29, 30 or 29', 30', the current detector 29, 30 serving to detect the current strength of the AC power source 26 connected to the rectifier 27, 28, the current detector 29', 30' serving to detect the DC current strength after the rectification, an arc current controller 31, 32 for controlling output voltage from the rectifier 27, 28 so as to harmonize detected current strength of the current detector 29, 30 or 29', 30' with a preset current strength value, a voltage detector 33, 34 for detecting voltage across the upper and lower conductors 20 and 22, 21 and 23 and an arc voltage controller 35, 36 for controlling the vertical movement of the lifting device 18, 19 so as to harmonize detected voltage of the voltage detector 33, 34 with a preset voltage value. Further provided is an arc deflection commanding device 41 which serves to feed the preset current strength values 37 and 38 and the preset voltage values 39 and 40 to the arc current controllers 31 and 32 and the arc voltage controllers 35 and 36, respectively.

Since, as mentioned above, the upper conductors 20 and 21 connected to the upper electrodes 16 and 17 extend in the directions away from the upper electrodes 17 and 16, respectively, the two lower conductors 22 and 23 are connected to the lower electrode 1 and extend in the same directions of the upper conductors 20 and 21, respectively, and the separate power source circuits 24 and 25 are arranged between the extension ends of the upper and lower conductors 20 and 22 and 21 and 23, respectively, then an arc 12a generated between the electrodes 1 and 16 and an arc 12b generated between the electrodes 1 and 17 receive forces F in the directions opposite to the extending directions of the lower conductors 22 and 23 and further receive forces generated by magnetic fields due to the currents flowing upward from the lower electrode 1 through the upper electrodes 16 and 17, respectively. As a result, the respective arcs 12a and 12b are directed to the center of the furnace shell 2.

Therefore, the material 11 fed to the center of the furnace shell 2 is effectively melted and temperature distribution in the furnace shell is symmetric so that the efficiency of melting the material is enhanced. Because of the arcs 12a and 12b being directed to the center of the furnace shell 2, the furnace peripheral wall 14 can be prevented from being damaged and therefore distance between the furnace peripheral wall 14 and the upper electrodes 16 and 17 can be minimized to compact the furnace shell 2 in size.

When the two upper electrodes 16 and 17 are provided as mentioned above, the furnace shell 2 allows a space at its upper portion. The material charging port 15 may be provided at this space through which the scrap or the like material 11 is continuously charged to the center of the furnace shell 2. In this case, unmelted material is accumulated at the center of the furnace shell 2 and the arcs 12a and 12b are deflected to the center of the furnace shell 2, which further advantageously increases the melting efficiency.

Because of the power source circuits 24 and 25 comprising the arc current controllers 31 and 32 for controlling the output voltages of the rectifiers 27 and 28 so as to harmonize the current strengths of the AC power sources 26 or the DC currents after the rectification with the preset current strength values, the arc voltage controllers 35 and 36 for controlling the vertical movements of the upper electrodes 16 and 17 so as to harmonize the voltages across the upper and lower conductors 20 and 22 and 21 and 23 with the preset voltage values and the arc deflection commanding device 41 for feeding the preset values to the arc current controllers 31 and 32 and the are voltage controllers 35 and 36, respectively, then the current strengths and are voltages can be changed to change the deflected degree of the arcs 12a and 12b.

Figure 1:
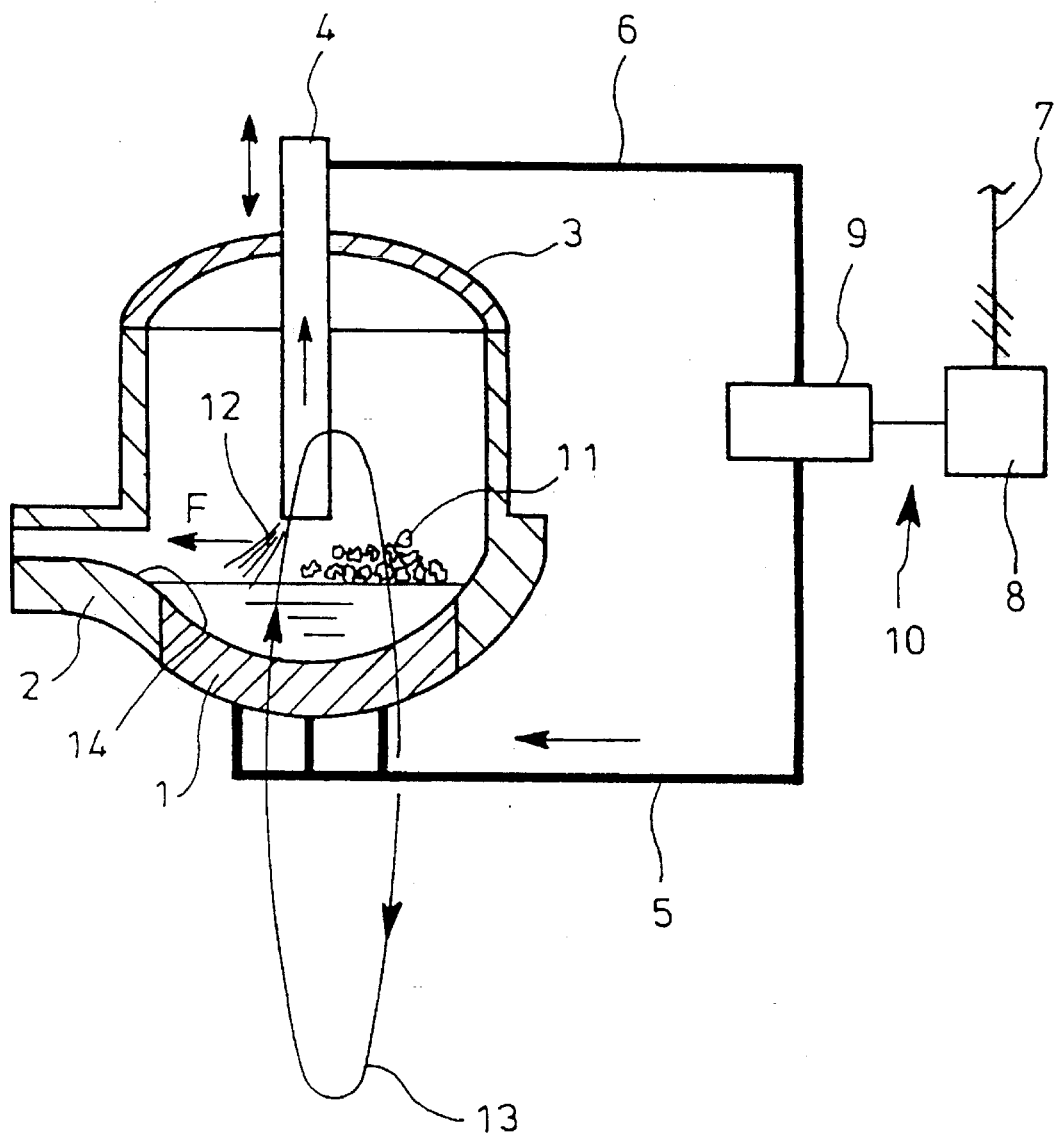
FIG. 1 is a side view in section of a conventional DC arc furnace.

Upon generation of the arcs 12a and 12b by the power source circuits 24 and 25, are voltage is substantially in proportion to arc length (if the are length is short, heavy-current flows to lower the voltage). On the basis of this fact and under the condition that current strength×are length= constant (are voltage constant), strength H of the magnetic field 13 (FIG. 1) acted on the generated arcs 12a and 12b by the lower conductors 22 and 23 is calculated. On the supposition that the deflected degree of the arcs 12a and 12b is in proportion to the strength H of the magnetic field 13 and using experimentally obtained constant as proportional coefficient when distance between the upper electrodes 16 and 17 is 4m, the deflected degree of the arcs 12a and 12b is obtained.

Figure 4:
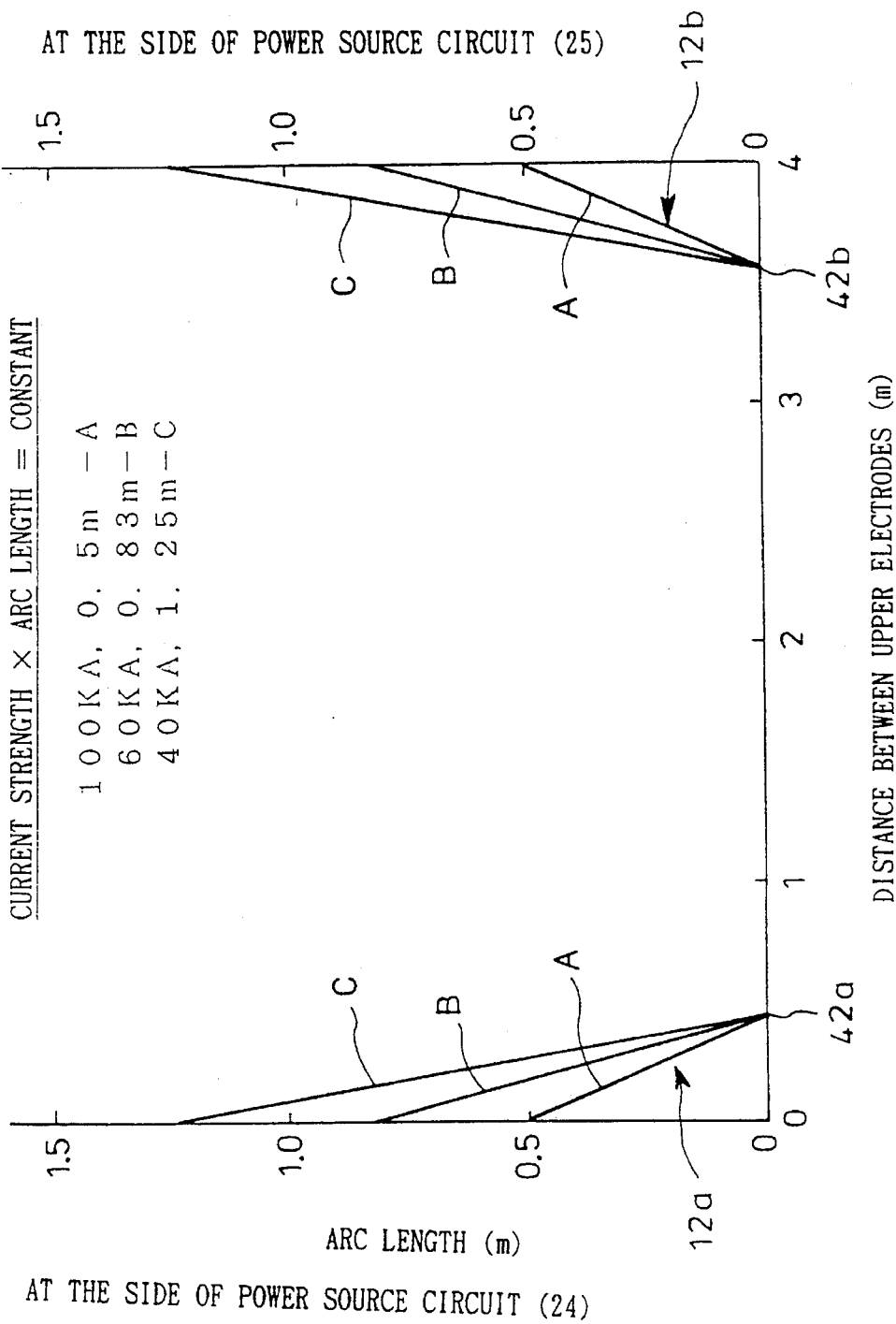
FIG. 4 is a diagram showing the position of arc point in calculation when the arc voltages and arc current strengths are constant in the one and the other power source circuits.

FIG. 4 shows deflection of the arcs 12a and 12b when current charge conditions of the two power source circuits 24 and 25 are the same. In this case, even if the combination of the arc current strength with arc length is changed as shown in A, B or C, the arc points 42a and 42b of the arcs 12a and 12b remain unchanged.

Figure 5:
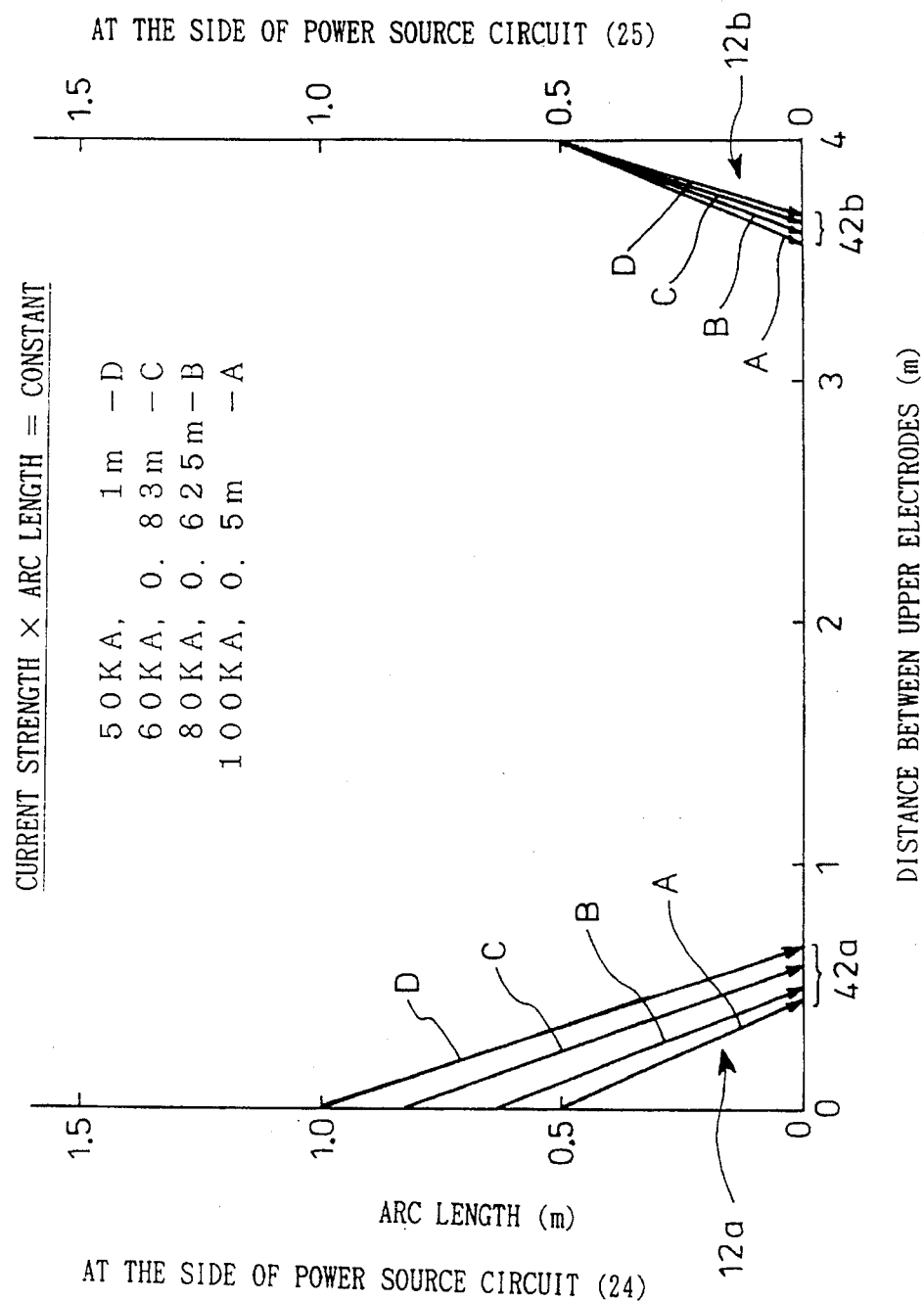
FIG. 5 is a diagram showing various arc points in calculation when the arc voltage and arc current strength of the one power source circuit are fixed and those of the other power source circuit are varied.

FIG. 5 shows changes of the arc points 42a of the arc 12a as shown in A, B, C and D when the conditions of the one power source circuit 25 are constant (the arc length of the arc 12b is short and the arc current of the arc 12b is great) and the upper electrode 16 is vertically controlled in position by the lifting device 18 so as to lengthen the arc length of the arc 12a of the other power source circuit 24.

Such deflection of the arc length will cause the arc point 42a to be laterally displaced between the upper electrodes 16 and 17 so that the arc 12a is positively directed to the unmelted material 11, thereby further preventing the unmelting of the material 11. When such operation is alternately effected by the power source circuits 24 and 25, then uniform charge of electric power can be made in a predetermined range on the line connecting the upper electrodes 16 and 17, which eliminates generation of hot spots and leads to effective melting of the material in more uniform temperature.

It is to be understood that the present invention is not limited to the above-described embodiment and that various modifications may be made without leaving the true spirit of the present invention. For example, the furnace shell may have various shapes.

INDUSTRIAL APPLICABILITY

In a DC arc furnace for melting scrap or the like material, the present invention is suitable for enhancing the efficiency of melting the material, preventing the furnace peripheral wall from being damaged, compacting the furnace shell in size, accelerating the concentrated melting of the unmelted material and eliminating hot spots.

We claim:

1. A DC arc furnace characterized by comprising a furnace shell with a lower electrode at a bottom thereof, a furnace roof adapted to close an upper portion of said furnace shell, two upper electrodes horizontally spaced apart from each other with a predetermined distance and vertically extending through said furnace roof, lifting devices for vertically moving the upper electrodes independently from each other, upper conductors each connected to the corresponding upper electrode and extending in the direction away from the remainder of the upper electrodes, two lower conductors connected to said lower electrode and each extending in a direction along which the corresponding upper conductor extends and power source circuits each arranged between extension ends of the corresponding upper and lower conductors.

2. The furnace according to claim 1, characterized in that said power source circuit comprises a rectifier, a current detector for detecting current strength of an AC power source connected to the rectifier or detecting DC current strength after the rectification, an arc current controller for controlling output voltage from the rectifier so as to harmonize detected current strength of the current detector with a preset current strength value, a voltage detector for detecting voltage across the corresponding upper and lower conductors, an arc voltage controller for controlling the vertical movement of the corresponding lifting device so as to harmonize detected voltage of the voltage detector with a preset voltage value and an arc deflection commanding device for feeding preset current strength and voltage values to the arc current controllers and the arc voltage controllers.

\* \* \* \* \*